(12) United States Patent
Robinson et al.

(10) Patent No.: US 6,207,264 B1
(45) Date of Patent: *Mar. 27, 2001

(54) MONOLITHIC ACTIVATED CARBON

(75) Inventors: Ken K. Robinson, St. Charles; Rodney L. Mieville, Glen Ellyn, both of IL (US)

(73) Assignee: Mega-Carbon Company, St. Charles, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/206,626

(22) Filed: Dec. 7, 1998

Related U.S. Application Data

(63) Continuation-in-part of application No. 08/600,883, filed on Feb. 13, 1996, now Pat. No. 5,846,639.

(51) Int. Cl.[7] .................................................... B32B 5/18
(52) U.S. Cl. ................................ 428/304.4; 428/315.5; 428/315.7; 428/317.1; 428/317.7; 428/317.9
(58) Field of Search ............................ 428/304.4, 315.5, 428/315.7, 317.1, 317.7, 317.9

(56) References Cited

U.S. PATENT DOCUMENTS

| | | | |
|---|---|---|---|
| 1,899,339 | 2/1933 | Klebert . | |
| 3,352,788 | 11/1967 | Conlisk | 252/161 |
| 3,391,234 | 7/1968 | Walenciak et al. | 264/117 |
| 3,901,823 | 8/1975 | Dimitri et al. | 252/428 |
| 3,951,859 | 4/1976 | Inaba et al. | 252/430 |
| 3,960,761 | 6/1976 | Burger et al. | 252/421 |
| 3,969,124 | 7/1976 | Stewart | 106/56 |
| 3,976,055 | 8/1976 | Monter et al. | 128/2.06 |
| 3,978,000 | 8/1976 | Schmitt, Jr. et al. | 252/447 |
| 4,000,236 | 12/1976 | Redfarn et al. | 264/112 |
| 4,076,892 | 2/1978 | Fennimore et al. | 428/407 |
| 4,082,694 | 4/1978 | Wennerberg et al. | 252/444 |
| 4,124,529 | 11/1978 | Juntgen et al. | 252/421 |
| 4,233,191 | 11/1980 | Reuter et al. | 252/511 |
| 4,242,226 | 12/1980 | Siren | 252/422 |
| 4,374,941 | 2/1983 | Sandstrom | 523/206 |
| 4,518,704 | 5/1985 | Okabayashi et al. | 502/80 |
| 4,551,267 | 11/1985 | Fushimi et al. | 252/511 |
| 4,677,086 | 6/1987 | McCue et al. | 502/62 |
| 4,717,513 | 1/1988 | Lewis et al. | 556/9 |
| 4,717,595 | 1/1988 | Watanabe et al. | 427/221 |
| 4,795,735 | 1/1989 | Liu et al. | 502/415 |
| 4,857,243 | 8/1989 | Von Blucher et al. | 264/13 |
| 5,306,675 | 4/1994 | Wu et al. | 502/5 |
| 5,331,037 | 7/1994 | Koslow | 524/496 |
| 5,389,325 | 2/1995 | Bookbinder et al. | 264/177.12 |
| 5,543,096 | 8/1996 | Wu | 264/63 |
| 5,744,421 | 4/1998 | Robinson et al. | 502/416 |
| 5,846,639 | 12/1998 | Robinson et al. | 428/304.4 |

FOREIGN PATENT DOCUMENTS

| | | |
|---|---|---|
| 1121474 | of 1868 | (GB) . |
| 1144325 | 4/1969 | (GB) . |

*Primary Examiner*—Elizabeth M. Cole
(74) *Attorney, Agent, or Firm*—Olson & Hierl, Ltd.

(57) ABSTRACT

A highly adsorbent, temperature-resistant monolithic activated carbon article is obtained by forming an aqueous emulsion of a polymeric binder, combining the resulting aqueous emulsion with wet, activated carbon particles to produce a slip mixture, forming the obtained slip mixture into a shaped article, and thereafter curing the shaped article.

15 Claims, No Drawings

MONOLITHIC ACTIVATED CARBON

TECHNICAL FIELD OF THE INVENTION

This application is a continuation-in-part of U.S. Ser. No. 08/600,883, filed on Feb. 13, 1996, now U.S. Pat. No. 5,846,639.

TECHNICAL FIELD OF THE INVENTION

The present invention relates to activated carbon articles of manufacture. More particularly, this invention relates to activated carbon monoliths having a relatively high surface area.

BACKGROUND OF THE INVENTION

Activated carbon is an excellent adsorbent. Activated carbon is commercially available in various forms, including granules and powders. In some applications of activated carbon, void spaces between carbon particles are important both for ensuring sufficient adsorbate contact and for allowing fluid to pass through the carbon adsorbent without encountering an excessive pressure drop. In other applications, however, the void space is not a principal concern. In the storage of hydrogen, ammonia, or natural gas, for example, carbon adsorption is most efficient on a volume basis when the carbon is formed into a high-density block with most of the void volume between the individual particles greatly reduced or even eliminated.

Efforts at creating such high-density solid structures are reflected in techniques developed for compaction and binding of activated carbon particles. For example, U.S. Pat. No. 4,000,236 to Redfarn et al. discloses a method for making a conglomerated activated carbon mass by means of a polymer rendered adhesive by a solvent. U.S. Pat. No. 4,717,595 to Watanabe et al. describes a method for producing carbonaceous material from carbon particles covered with a binder. U.S. Pat. No. 5,306,675 to Wu is directed to a method for producing activated carbon structures using methyl cellulose binders and microwave radiation curing.

These and other conventional techniques suffer from one or more serious drawbacks as follows: loss of surface area, corrupted pore distribution, limited temperature resistance, overly fragile green state, and high manufacturing costs. The carbon structures produced utilizing such methods also tend to have reduced surface area, lower adsorption capacity, and an undesirable pore size distribution. Furthermore, these carbon structures are not temperature-resistant, but tend to disintegrate when subjected to elevated temperatures.

Conventional binding techniques in particular cause a significant loss in available surface area for the activated carbon particles. With heretofore available techniques, binding and related agents are known to plug pores of the activated carbon particles whereby the favorable pore-size distribution of the original carbon particles is corrupted in favor of undesirably larger pore sizes.

This plugging phenomena is especially problematic for activated carbons with very high surface areas (>2000 m$^2$/g). Efforts at using polymeric resins to bind very high surface area (>2000 g/m$^2$) carbons have generally failed heretofore because the resulting carbon structures had either surface areas greatly reduced from those of the original carbon particles or inadequate mechanical strength. In addition to reduced surface area, the thermal stability of carbon structures made by conventional techniques is inadequate for many otherwise appropriate applications.

Inorganic binders also have been used as binders in carbon mixtures to impart strength and thermal stability. For example, U.S. Pat. No. 4,518,704 to Okabayashi et al. describes a process for making activated carbon bodies using a clay binder. Unfortunately, a very expensive sintering step is required for such inorganic binders, e.g. firing at 900° C. in an inert atmosphere. Furthermore, the mechanical strength of such bodies is inadequate for many applications.

Many uses for activated carbon require that the adsorbent fit into canisters and other devices of varying shapes and sizes. Such potential applications for activated carbon articles of manufacture thus far have gone unrealized because the required shapes and sizes for the solid articles could not be obtained. Standard binding methods for creating activated carbon structures often do not permit molding into unique shapes and sizes because the uncured, or green state, of the structure is either too fragile or too inflexible, thereby limiting workability.

Thus, there continues to be a need for improved very high surface area activated carbon structures as well as for methods for making such structures. The need also exists for methods of making activated carbon structures from activated carbon particles generally, without a substantial loss in carbon surface area.

SUMMARY OF THE INVENTION

A highly adsorbent monolithic activated carbon article is obtained by wetting activated carbon particles preferably having a surface area in excess of about 2000 m$^2$/g, forming an aqueous emulsion of a polymeric binder, combining the resulting aqueous emulsion with the wetted carbon to produce a slip mixture, forming the obtained slip mixture into a shaped structure, and thereafter curing the structure.

The monolithic activated carbon article produced in the foregoing manner exhibits substantially no change in compressive strength upon heating to 275° C. and consists essentially of the activated carbon and a polymeric binder present in an amount up to 13 percent, based on the weight of the composition. The monolithic activated carbon article has an open pore structure, a surface area in excess of 2000 m$^2$/g of article, a pore size distribution such that at least 50 percent of total pore volume is constituted by pores less than about 2 nanometers in diameter and at least about 75 percent of total pore volume by pores less than about 4 nanometers diameter. The monolithic activated carbon article has a bulk density of at least about 0.25 grams/cubic centimeter.

The present invention also provides microporous, monolithic carbonaceous articles having a formation efficiency, as defined below, in excess of about 75 percent and exhibiting substantially no loss in compressive strength upon heating to 200° C. For this aspect of the present invention, the carbonaceous articles consist essentially of activated carbon having a surface area in excess of about 1100 m$^2$/g and a polymeric binder present in an amount up to 13 percent based on the weight of the article.

Another aspect the present invention provides microporous, monolithic carbonaceous articles that have a butane activity in excess of about 10 grams per deciliter, consist essentially of activated carbon and a polymeric binder present in an amount up to 13 percent (based on the weight of the article) but exhibit substantially no loss in compressive strength upon heating to 200° C.

DESCRIPTION OF THE PREFERRED EMBODIMENTS

While this invention is susceptible of embodiment in many different forms, there are described herein in detail specific embodiments thereof with the understanding that the present disclosure is to be considered as an exemplification of the principles of the claimed invention and is not to be limited to the specific embodiments illustrated.

As used herein the term "formation efficiency" refers to the surface area of unformed (i.e., unbonded) activated carbon per unit mass divided by the surface area of the carbonaceous article per unit mass of article, and is expressed as a percentage.

The monolithic article of the present invention consists essentially of activated carbon particles bonded together with a polymeric binder while maintaining an open pore structure. The monolithic article is formed from free flowing activated carbon particles having a surface area greater than about 2000 $m^2/g$ and pores preloaded with water, which particles are combined with a polymeric binder in an amount up to about 13 percent by weight of the resulting composition to form a slip mixture which is then cured. The preloading of pores is effected by prewetting the carbon particles with water.

The resulting mass is a slip mixture which is then formed to a desirable shape by manipulation such as molding or extrusion. The article is then cured to a rigid shape by heating. Suitable emulsifying and rheology modulating agents may be added to the slip mixture as necessary to achieve a desired consistency.

The solid monolithic articles of the present invention made in the foregoing manner exhibit relatively high adsorption capacity as well as relatively high compressive strength of the order of about 500 psi, or higher, at temperatures up to 350° C.

The principal ingredient of the present invention is activated carbon. Activated carbon is a non-graphitic microcrystalline form of carbon which has been processed to produce carbon particles having relatively high porosity. This microcrystalline form of carbon is made up of six-member carbon rings separated by areas of disorganized carbon. The pore scheme adopted by the International Union of Pure and Applied Chemistry classifies pores according to their width as follows: micropores-pores which are less than about 2 nanometers in diameter, mesopores-pores which are about 2 to about 50 nanometers in diameter, and macropores-pores which are more than 50 nanometers in diameter.

Activated carbons having BET surface area in the range of 450 to 3000 $m^2/g$ are commercially available with various types of microporosity present in the activated carbon. Depending on the intended application, the activated carbon can vary as far as particle size, surface area, adsorption capacity for hydrocarbons, adsorption efficiency, porosity, pore size, etc. The carbon can be of single type or a blend of types. However, activated carbon suitable for the present invention has a BET surface area above about 2000 $m^2/g$, and about 50 percent of total pore volume of the activated carbon constituted by pores smaller than 4 nanometers in diameter.

Alternatively, activated carbon suitable for the present invention has a butane activity above about 9 grams per deciliter (100 ml) without specific requirements as to pore size distribution. As used herein, the term "butane activity" refers to the amount of butane adsorbed on carbon after the carbon has been present in a pure gaseous butane environment at about 1 atmosphere and about 25° C. for 10 minutes. Butane activity is expressed in unit mass of butane adsorbed per unit volume of activated carbon. Acceptable activated carbons having desirable butane activities are commercially available from Westvaco, Inc. under the designations "WVA 1100" and "BAX 1000."

Activated carbons having a surface area above about 1200 $m^2/g$ are adequate for the present purposes. Preferably, the active carbon BET surface area exceeds about 2000 $m^2/g$, more preferably about 2500 $m^2/g$, and about 80 percent of total pore volume is constituted by pores smaller than 4 nanometers in diameter.

One type of activated carbon suitable for use in practicing this invention is commercially available from The Kansai Coke & Chemicals Co. Ltd (Amagasaki, Japan) under the designation "Maxsorb." A particularly preferred variety of activated carbon is activated carbon designated as "Maxsorb 2400." Another type of suitable activated carbon is described in U.S. Pat. No. 4,082,694 to Wennerberg ("PX-21"; Amoco Corporation, Chicago, Ill.).

In making the carbon structures of this invention, the activated carbon preferably is in the form of a fine powder wherein about 50 percent of the particles have a size of 5 to 50 microns as measured by Coulter Counter technique. Commercially available carbons can be ground to smaller sizes by conventional methods if desired. If, however, attributes of increased surface area are relatively favored over increased crush strength, granules or particles rather than fine powder are the preferred form of activated carbon. Where granules are employed, the preferred mean particle size is in the range of about 0.5 to about 3 millimeters.

A critical component of the present activated carbon article is the polymeric binder. Illustrative of such polymeric binders are polyurethane latex, polyacrylate latex, polyvinylacetate, polyvinyl chloride, isoprene rubber latex, butadiene rubber latex, isobutene-isoprene rubber latex, thiokol latex, styrene-butadiene rubber (SBR) latex, acrylonitrile-butadiene rubber (NBR) latex, chloroprene rubber latex, polysilsesquioxanes, and the like. In the present article, the polymeric binder is a curable polymer or monomer emulsifiable in water, and is present in an amount up to 13 percent by weight, based on the weight of the composition. Preferably, in the present articles the polymeric binder is present in an amount in the range of about 1 percent by weight to about 10 percent by weight, more preferably about 4 percent to about 9 percent by weight.

Preferred polymeric binders that are water dispersible are derived from urethanes, acrylates, epoxies, vinyl acetates, imides, and mixtures thereof, to provide as the binder in the finished article, a polymer which is the corresponding polyurethane, polyacrylate, an epoxy, a vinyl acetate, a polyimide, or a mixture of any of the foregoing. Exemplary monomers include vinyl acetate, esters of acrylic acid, esters of polyglicidyl ethers of phenol formaldehydes, esters of 1-methyl-2-pyrrolidone, and esters of glycol methyl ether. An ester of acrylic acid is commercially available from Rohm & Hass Co. (Philadelphia, Pa.) under the designation "Acryloid AT 51." A preferred polymeric binder precursor is vinyl acetate, commercially available from Union Carbide Corporation (Danbury, Conn.) under the designation "UCAR 379."

The above polymeric binders can also contain varying amounts of crosslinking agents such as epoxide resins. A catalyst may be incorporated with the polymeric binder to promote curing rate.

An optional but preferred component of the article of the present invention is a co-binder. Suitable co-binders are water soluble polymers that impart green strength to the slip mixture. Preferably, co-binders cure at temperatures lower than the temperatures required to cure the water-dispersible polymeric binder. The use of a co-binders that cure at temperatures lower or higher than the temperatures required to cure the primary binder permits a two stage curing schedule in which a partially cured article is stable for handling and shaping already after the first or initial stage.

Preferred co-binders include water-soluble polymers such as methyl cellulose available from Aldrich Chemical Company Inc. (Milwaukee, Wis.), methyl cellulose ether available from Dow Chemical Co. (Midland, Mich.), and polyacrylic acid available from B. F. Goodrich (Akron, Ohio) under the designations "Carbopol ETD 2691" and "Carbopol 674."

An important part of the method for preparing the temperature-resistant carbonaceous monolithic articles of the present invention is the prewetting of the carbon particles with water. Water is used in an amount sufficient to fill a major portion of, preferably substantially all of the smaller pores of the activated carbon particles while maintaining the wet particles free flowing. Surfactants are not required to suitably wet the carbon particles.

The amount of water combined with the carbon particles during prewetting is of the order of about 10 percent to about 60 percent, based on the dry weight of the activated carbon. While at least 10 percent water is desired in the carbon particles, the proper amount of water is determined primarily by the pore volume of the particular activated carbon. Prewetting with water in the range between 30 percent and 60 percent has been found to be preferred as long as the prewetted particles are maintained in a free flowing state. The resulting wetted carbon has a free-flowing powder-like consistency when combined with the emulsified polymeric binder.

The polymeric binder is emulsified in an aqueous medium before combining with the wetted activated carbon. If necessary or desirable for emulsification, the binder can be first dissolved in an organic and water-insoluble solvent, which can be non-polar or polar. Illustrative non-polar solvent is toluene. Illustrative polar solvent is tetrahydrofuran. Preferably, the amount of solvent used to form the resulting solution that is to be emulsified is minimized inasmuch as the solvent is subsequently removed.

For epoxy-derived polymeric binders, an aromatic non-polar solvent such as toluene has been used successfully for this function in solvent-to-polymeric binder respective weight ratios in the range of about 1:1 to about 4:1. For amide-imide polymer binders, a polar solvent such as tetrahydrofuran has been used successfully as the solvent in solvent-to-polymeric binder respective weight ratios in the range of about 1:1 to about 4:1.

The optional co-binder may be admixed directly to the polymer emulsion or first dissolved in water and then added to the emulsion, usually in an amount in the range of about 2 to about 5 by weight percent based on the weight of the activated carbon.

The aqueous emulsions produced in the foregoing manner are next combined with the prewet carbon particles to form a slip or slip mixture. At any step in the preparation of this slip mixture, emulsifying agents and rheological aids can be used to achieve the desired characteristics. For example, a surfactant can be used to aid in the emulsification of the polymeric binder in water. The surfactant can be anionic, non-ionic, cationic, as well as amphoteric, depending upon the particular binder. In general anionic surfactants are preferred. Such compounds are not required, however.

Thickeners can be combined with the wetted carbon to impart greater fluidity and green strength to the slip mixture, as well as greater strength to the uncured, or green state structures formed from the slips. A number of thickeners are available that are suited for use in the present invention. These include water-soluble polymers such as methyl cellulose available from Aldrich Chemical Company Inc. (Milwaukee, Wis.), methyl cellulose ether available from Dow Chemical Co. (Midland, Mich.), and polyacrylic acid available from B. F. Goodrich (Akron, Ohio) under the designations "Carbopol ETD 2691" and "Carbopol 674."

The rheological properties of the slip mixture can be adjusted as required for the desired shaping method. A gel-like consistency for the slip mixture is usually desirable for extrusion, while a finer consistency is desired for a relatively larger molded structure or block. Where the slip mixture is too thick, a thinner can be added. Suitable thinners are typically surfactants and include but are not limited to naphthalene sulfonates—available from W. R. Grace and Co. (Boca Raton, Fla.) under the designation "Daxad 19-L," 2,4,7,9-tetramethyl-5-decyne-4,7-diol—available from Air Products and Chemicals Inc. (Allentown, Pa.) under the designation "Surfynol GA," trisodium phosphate, sodium lauryl sulfate, and the like.

Where the slip mixture is too thin, a thickener such as methyl cellulose can be added to the carbon slip and improve green strength. While use of emulsifying agents and rheological aids sometimes requires an iterative approach, these additives are readily substitutable and are optional rather than critical aspects of the present invention. With regard to the emulsification step, for example, greater mixing intensity during emulsification can replace the use of a surfactant.

Various fillers also can be added to the original mixture in order to impart specific characteristics or properties to the shaped and/or dried structure. Fillers can be present in an amount up to about 25 percent by weight, preferably about 0.1 to about 5 percent by weight, of the total weight of the dried monolithic article. Formation of the admixture, with proper dispersion of the fillers is enhanced by addition of surfactants previously described. One preferred filer, chopped carbon fibers, can be added to reinforce the structure of the monolithic carbonaceous article. Suitable carbon fibers are available from Amoco Corporation under the designation "Thornel T-300"

To form a desired shape of the carbonaceous structure, the slip mixture may be cast in a mold and then cured by heating. After the slip mixture has been poured in a mold, a compression step can be used to dewater and densify the slip mixture. Alternatively, the slip can be poured into a plaster of Paris mold or other water absorbent material. In addition, a degassing step can be included, for example by subjecting the filled mold to vibration or a vacuum.

The filled mold is heated, preferably in stages. In the first stage, the mold is heated at temperatures up to about 120° C. to dry the slip and to set co-binders, if present. In the second stage, the temperature is gradually increased to levels sufficient to cure the polymeric binder present. As tested, sufficient temperatures fall within the range of about 150° C. to about 250° C. If desired, the slip cast can be removed following the first stage and then heated outside the mold.

As an alternative to the molding, the slip mixture can be extruded into desired shapes using commercially available extruders. The produced extrudates then can be heated in a separate step to fully cure the polymeric binder.

After curing, the monolithic carbonaceous structures of the present invention has several key features. Thermal stability, or temperature resistance, is an important feature. Structures according to the present invention retain good mechanical strength upon heating to 275° C. Furthermore, these structures have high adsorption capacity per unit volume when compared to prior art active carbon structures.

This high-adsorption capacity is obtained because the active carbon structures of the present invention have relatively high surface area, favorable pore distribution, and high bulk density. More specifically, the structures of the present invention have formation efficiencies in excess of about 75 percent.

When employing activated carbon characterized as having a butane activity in excess of about 9 grams per deciliter, butane activities above 8 grams per deciliter can be achieved for carbonaceous articles that exhibit substantially no loss in compressive strength even upon heating to 200° C.

The present invention also successfully utilizes activated carbons characterized as having a very high surface area. With these structures, available surface area exceeds about 2000 $m^2/g$ of articles, and at least 50 percent of the pore volume is supplied by micropores. Also significantly, bulk densities in excess of 0.25 $g/cm^3$ can be achieved.

Monolithic carbon structures constructed according to the present invention are particularly useful as adsorbents. As required in this application, the adsorbent must have a relatively high adsorbent capacity per unit volume as well as mechanical strength over temperature cycles from as low as 0° C. to as high as 275° C.

A key benefit of the process of the present invention is the use of a polymeric binder in reduced amounts which causes minimal loss of retention volume or surface area. According to the present invention, the level of polymeric binder is kept below 20 percent based on the weight of the structure, without sacrificing compressive strength. By minimizing the amount of binder present, the surface area of the obtained molded carbon structures is not greatly reduced.

Loss of surface area by plugging of the carbon pores is also avoided. During fabrication, carbon pores are filled with water to fill the pores thereof and thereby protected them from plugging with binder. This protection is obtained because carbon particles are prewetted and because the polymeric binder is applied as an aqueous emulsion.

No high-cost firing or sintering step is required when practicing the present invention. Rather, curing is substantially complete upon drying the slip mixture at a temperature that does not exceed about 250° C. Despite the absence of a traditional firing or sintering step, the present monolithic carbonaceous structures so formed have high mechanical strength as well as thermal stability and structural integrity.

A further benefit of the method of the present invention is that the uncured slip mixtures can be made strong enough for handling after moderate heating and minimal use of environmentally unfriendly organic solvents.

The present invention is illustrated by the following examples.

EXAMPLE 1

Temperature-Resistant Monolithic Carbon Structures by Application of Silsesquioxane Binders In An Aqueous Emulsion Prewetted, high surface area activated carbon particles, were combined with an aqueous emulsion of a silsesquioxane binder and a polyvinyl acetate co-binder and cured to produce a monolithic carbon structure exhibiting good thermal stability and adsorption capacity.

The high surface area of the unbound activated carbon particles was retained inasmuch as carbon pores were pre-filled with water and the binder was in the form of an aqueous emulsion. Filled with water, pores were inaccessible to the binders.

In particular, the following ingredients were used:

| | |
|---|---|
| activated carbon (Amoco PX-21, 2500 $m^2/g$; dried) | 50 g |
| vinyl acetate emulsion (50 wt-% solids) | 3 g |
| water addition | 30 g |
| methyl cellulose solution (0.5 wt-%) | 20 g |
| silsesquioxanes (GE SR240) | 10 g |
| toluene (solvent) | 20 g |
| catalyst (GE SRC-11) | 50 µl |

Water was added to the dried carbon to fill the pores and protect them from toluene which was added later as part of the silsesquioxane emulsion. A carbon paste was obtained. The methyl cellulose solution was added to the carbon paste.

An emulsion was prepared by dissolving the silsesquioxanes in toluene and then pouring the obtained solution into an aqueous surfactant solution which was being stirred as the silsesquioxane/toluene solution was added. The catalyst was added to the silsesquioxane/toluene solution which was then emulsified. The catalyzed silsesquioxane emulsion was then added to the carbon paste. Thereafter, the vinyl acetate emulsion was added and the resulting admixture was blended thoroughly. Additional water was added to achieve the desired fluidity of the produced slip.

The slip was then poured into a mold and vibrated with a hand vibrator to remove air bubbles, and then gently compressed with a wafer or piston on top and bottom to partially dewater. The dewatered slip was gradually heated to 120° C. to remove water and to set the vinyl acetate binder. Thereafter the temperature was increased to 200° C. to activate the curing process for the silsesquioxane binder. The temperature was maintained for about one hour, and thereafter the mold was permitted to cool to ambient temperature. A temperature-resistant, microporous, monolithic carbonaceous block was obtained with a surface area of about 1990 $m^2/g$ of article, or on a unit carbon basis, 2290 $m^2/g$. The compressive strength was 1100 psi.

EXAMPLE 2

Different Activated Carbon

An additional structure was prepared according to the procedure of Example 1 except that a different activated carbon was used and no additional water was added to the carbon slip. In particular, the following ingredients were used:

| | |
|---|---|
| activated carbon (Kansai Maxsorb 2200, dried) | 2.5 g |
| vinyl acetate emulsion (50% solids) | 0.15 g |
| methyl cellulose solution (0.5 wt-%) | 0.25 g |
| silsesquioxanes (GE SR240) | 0.5 g |
| toluene (solvent) | 1 g |
| catalyst (GE SRC-11) | 2.5 µl |

The resulting activated carbon structure was evaluated for ammonia adsorption, achieving 600 mg $NH_3$/g carbon.

EXAMPLE 3

Effect of Binder Concentration

Activated carbon articles were prepared from mixtures of Kansai Maxsorb 2400 and Maxsorb 3000 particles in a manner similar to Example 2, above. The activated carbon particle mixture had an equivalent surface area of about 2600 m²/g. After curing, the compressive strength and the surface area of the produced articles were determined. The results are shown in Table 1A.

TABLE 1A

| Silsesquioxane Level, GE SR240 (wt-%) | Vinyl Acetate Co-binder (wt-%) | Compressive Strength at Room Temperature (psi) | Surface Area* (m²/ g carbon) | Surface Area (m²/g block) |
| --- | --- | --- | --- | --- |
| 4 | 0 | 722 | 2573 | 2144 |
| 8 | 0 | 991 | 2548 | 2212 |
| 17 | 0 | 1699 | 2572 | 2057 |
| 0 | 3 | 722 | 2578 | 2501 |
| 0 | 6 | 1402 | 2393 | 2297 |
| 4 | 3 | 867 | 2322 | 2160 |
| 8 | 3 | 1558 | 2274 | 2024 |

*Iodine Number results, correlated per Proceedings of "Carbon 92," International Carbon Conference, Essen, Germany, June 1992.

Presented in Table 1B are the formation efficiency properties for each of the produced articles.

TABLE 1B

| Silsesquioxane Level, GE SR240 (wt-%) | Vinyl Acetate Co-binder (wt-%) | Formation Efficiency (%) |
| --- | --- | --- |
| 4 | 0 | 82.5 |
| 8 | 0 | 85.1 |
| 17 | 0 | 79.1 |
| 0 | 3 | 96.2 |
| 0 | 6 | 88.3 |
| 4 | 3 | 83.1 |
| 8 | 3 | 77.8 |

EXAMPLE 4

Effect of Silsesquioxane Level On BET Surface Area

The effect of silsesquioxane binder level in the activated carbon structure on surface area was evaluated. Using a procedure similar to that of Example 1, a series of activated carbon structures were prepared with varied levels of silsesquioxane binder to determine the resulting effect on surface area retention. The samples were prepared from activated carbon particles having a surface area of about 2600 m²/g. Results are reported in Table 2.

TABLE 2

| Silsesquioxane Level (wt-%) | Surface Area* (m²/g carbon) | Surface Area (m²/g block) |
| --- | --- | --- |
| 0 | 2611 | — |
| 4 | 2573 | 2144 |
| 8 | 2548 | 2212 |
| 17 | 2572 | 2057 |

*Iodine Number results, correlated per Proceedings of "Carbon 92," International Carbon Conference, Essen, Germany, June 1992.

Table 2 shows that the surface area per unit weight of carbon is generally unaffected by binder level. Of course, surface area per unit weight of the activated carbon structure decreases with increasing levels of binder because carbon is replaced by binder.

EXAMPLE 5

Effect of Binder Level And Fillers On Crush Strength

To determine the effect of silsesquioxane binder and vinyl acetate co-binder level on compressive strength, a number of cylindrical discs (0.62 in. diameter and 0.25 in. thick) were prepared using a procedure similar to that of Example 1. Compressive strength was measured by applying compressive force to the flat surfaces of the discs until fracture. Results are reported in the Table 3.

TABLE 3

| Silsesquioxane Level (wt-%) | Vinyl Acetate Co-binder (wt-%) | Compressive Strength at Room Temperature (psi) |
| --- | --- | --- |
| 4 | 0 | 676 |
| 8 | 0 | 927 |
| 17 | 0 | 1590 |
| 0 | 3 | 676 |
| 0 | 6 | 1312 |
| 4 | 3 | 811 |
| 8 | 3 | 1458 |

Table 3 shows that compressive strength generally increases with increasing silsesquioxane and vinyl acetate binder level.

To demonstrate the effect of carbon fiber fillers on the compressive strength of the activated carbon structures of the present invention, a sample was prepared with 8 percent silsesquioxane binder by weight, no co-binder, and 0.1 percent chopped carbon fibers. The sample structure exhibited a compressive strength exceeding 2600 psi, a significant increase over the compressive strength exhibited by a sample having the same level of silsesquioxane binder but lacking carbon fibers, 927 psi.

EXAMPLE 6

Molded Carbonaceous Article With Acrylic Acid Ester Binder

An additional article was prepared according to the procedure of Example 1 except that an acrylic acid ester binder (8.1 wt-%; based on carbon) was used with a different activated carbon and solvent. In particular, the following ingredients were used:

| | |
| --- | --- |
| activated carbon (Kansai Maxsorb 2400) | 2 g |
| water addition | 1.1 g |
| methyl cellulose solution (0.5 wt-%) | 1 g |
| acrylic acid ester (Acryloid AT-51; solid) | 0.166 g |
| xylene/butanol (solvent) | 0.45 g |

The acrylic acid ester binder was delivered to the carbon paste as 9 cc of an aqueous emulsion containing 1.8 wt-% solids.

The resulting sample was mechanically strong. Samples prepared earlier using a hydrocarbon sample only, with no water, were extremely fragile. The surface area was calculated to be 2212 m²/g of carbon article based on an Iodine Number of 1888 mg/g. Correcting for the binder in the formed carbon article, the surface are per unit of carbon is 2404 m²/g.

EXAMPLE 7

Molded Carbonaceous Article With Polyurethane Binder

An additional article was prepared according to the procedure of Example 1 except that a polyurethane binder (4.75 wt-%; based on carbon) without solvent was added to the prewetted carbon. In particular, the following ingredients were used:

| | |
|---|---:|
| activated carbon (Amoco PX-21, 2500 m²/g; dried) | 1 g |
| water addition | 1.1 g |
| methyl cellulose solution (0.5 wt-%) | 1 g |
| polyurethane | 0.05 g |

The polyurethane binder was derived from dipropyl glycol methyl ether as the polyol, with water and delivered to the carbon paste as an aqueous emulsion containing 25 wt-% solids. The surface area based on an Iodine Number of 1950 mg/m was calculated to be 2319 m²/g of carbon article, or correcting for the binder in the formed article, 2434 m²/g of carbon. Compression strength was rated as good.

EXAMPLE 8

Molded Carbonaceous Article With Epoxy Binder

An additional article was prepared according to the procedure of Example 1 except that an epoxy binder (9 wt-% binder; based on carbon) was used. In particular, the following ingredients were used:

| | |
|---|---:|
| activated carbon (Kansai Maxsorb 2400) | 1 g |
| water addition | 1.1 g |
| methyl cellulose solution (0.5 wt-%) | 2 g |
| ester of polyglyicidyl ether of phenol formaldehyde (Epoxylite 831-9) | 0.088 g |
| toluene | 0.088 g |
| catalyst (pyromllitic dianhydride) | 0.035 g |

The epoxy binder was obtained from by Epoxylite Corp. under the designation "Epoxylite 813-9." The prepared sample was mechanically strong with a compression strength of 83 psi after exposure to 350° C. The surface area was calculated to be 2319 m²/g of carbon article, based on an Iodine Number of 1950 mg/g. Correcting for the binder in the formed article, the surface area per unit of carbon was 2520 m²/g.

EXAMPLE 9

Monolithic Carbon Structures Utilizing Wood-Based Activated Carbon In Powdered Form Articles were prepared utilizing a wood-based activated carbon that is commercially available in granular form from Westvaco, Inc. (Covington, Va.) under the designation "WVA 1100." The WVA 1100 carbon has a BET surface area of about 1724 m²/g, a butane activity of about 12.2 grams per deciliter, and a particle size in the range of about 10 to about 25 mesh, U.S. Sieve Series. For a tabulation of U.S. Sieve Series screen nomenclature, see *Perry's Chemical Engineering Handbook,* 6th Ed., McGraw-Hill, Inc., New York, N.Y. (1984), p. 21-15 (Table 21-6). The carbon granules were ground to a powder before processing.

Specifically, the following ingredients were used:

| | |
|---|---:|
| dry powdered activated carbon | 100 g |
| vinyl acetate emulsion (55 wt-% solids) | 20 g |
| water addition | 150 g |
| methyl cellulose solution (1 wt-%) | 40 g |

The dried carbon was prewetted with 75 grams of water and a carbon paste was obtained. A pre-emulsified polyvinyl acetate was obtained in the form of UCAR 379, which is commercially available from Union Carbide Corporation (Danbury, Conn.). UCAR 379 contains about 55 weight percent solids in water. The methyl cellulose solution was mixed with the polyvinyl acetate emulsion, and then the emulsion mixture was blended into the carbon paste. Additional water was added to the blend to achieve the desired fluidity of the produced slip.

The slip was then compression cast into blocks and thereafter removed from the mold. The compressed, molded blocks were gradually heated to 120° C. to remove water and cure the vinyl acetate binder. This temperature was maintained for about two hours, and thereafter the mold was permitted to cool to ambient temperature. Microporous, monolithic carbonaceous blocks were obtained each containing about 10 weight percent binder (based on the weight of the block). Testing revealed butane activities of about 12.4 grams per deciliter and a compressive strength of about 4.3 kilograms per square centimeter.

EXAMPLE 10

Wood-Based Activated Carbon With Reduced Binder Level

Additional blocks were prepared according to the procedure of Example 9 but with less polymeric binder. The following ingredients were used.

| | |
|---|---:|
| dry powdered activated carbon | 100 g |
| vinyl acetate emulsion (55 wt-% solids) | 10 g |
| water addition | 150 g |
| methyl cellulose solution (1 wt-%) | 40 g |

The resulting blocks contained about 5 weight percent binder (based on the weight of the block) and had butane activities of about 13 grams per deciliter.

EXAMPLE 11

Monolithic Carbon Structures From Activated Carbon Granules

Activated carbon articles were also prepared from granules of wood-based activated carbon at two different binder levels. The granules used were in the range of about 10 to about 25 mesh, U.S. Sieve Series. The carbonaceous articles were made according to the procedures of Examples 9 and 10, respectively, except that the activated carbon was not ground into a powder before processing. The resulting carbon blocks were evaluated for butane adsorption. The results are reported in Table 4, below.

TABLE 4

| Vinyl Acetate Co-binder (wt-%) | Butane Activity (g/100 ml) |
| --- | --- |
| 10 | 18 |
| 5 | 19.3 |

The granule-based structures provided relatively increased butane activity as compared to the powder-based structures described in Examples 9 and 10.

EXAMPLE 12

Carbon Slab From Coal-Based Activated Carbon Extrudates

An activated carbon slab having dimensions of 24 by 18 by 1 inches was prepared using a U-shaped aluminum mold, coal-based activated carbon extrudates and a mixture of polymeric binders. The following ingredients were used to make the carbon slip.

| | |
| --- | --- |
| activated carbon extrudates | 800 g |
| polyvinyl acetate emulsion (UCAR 379 - 55 wt-% solids) | 60 g |
| polyvinyl acrylate emulsion (UCAR 163S - 55 wt-% solids) | 60 g |
| water addition | 800 g |

The activated carbon extrudates had a mean particle size of about 1.5 millimeters, a BET surface area of about 1210 $m^2/g$ and a butane activity of about 11.4 grams per deciliter (100 ml). Such coal-based activated carbon extrudates are commercially available from both Cameron Carbon Inc. (Baltimore, Md.) and Great Lakes Carbon Corp. (Houston, Tex.). UCAR 163S is a product designation of the Union Carbide Corporation (Danbury, Conn.) for emulsified polyvinyl acrylate.

The dry activated carbon extrudates were prewetted with 200 grams of water. The polyvinyl acetate (UCAR 379) and the polyvinyl acrylate (UCAR 163S) binders were dispersed together into 400 grams of water. After thorough mixing for about 30 seconds, the remaining 200 grams of water was added and mixed in thoroughly. The resulting binder emulsion was blended into the prewetted carbon to form a carbon slip.

The carbon slip was added to the mold in two stages. First, half the carbon slip was added into the mold. A wire mesh having hole dimensions of 1 by 1 inches was then positioned over the carbon slip in the mold. Next, the remaining half of the carbon slip was added to the mold. The exposed surface (24 by 18 inches) was troweled smooth and then compressed using a plank and a weight of about 75 kg.

The carbon in mold was allowed to dry at room conditions for about 8 hours and then cured in an oven at 80° C. for about 4 hours. The resulting carbon slab was strong but also relatively elastomeric. Testing revealed a butane activity of 11.3 grams per deciliter.

EXAMPLE 13

Carbon Structures From Petroleum Pitch-Based Activated Carbon Beads

Blocks were also prepared from activated carbon beads derived from petroleum pitch and having a BET surface area of about 1275 $m^2/g$ and a butane activity of about 11.45 grams per deciliter. The following ingredients were used to prepare the carbon slip:

| | |
| --- | --- |
| activated carbon beads | 800 g |
| polyvinyl acetate emulsion (UCAR 379 - 55 wt-% solids) | 60 g |
| polyvinyl acrylate emulsion (UCAR 163S - 55 wt-% solids) | 60 g |
| water addition | 800 g |

The procedures of Example 12 were used to prepare the slip, except that the pitch-based activated carbon beads having a mean particle size of about 0.5 millimeters were substituted for the coal-based extrudates. The slip was compression cast into blocks. The blocks contained about 10 weight percent polymeric binder (based on the weight of the blocks) and provided a butane activity of about 10.2 grams per deciliter.

EXAMPLE 14

Carbon Structures From Coconut Shell-Based Activated Carbon Granules

Blocks were also prepared from activated carbon granules derived from coconut shells. The coconut shell based granules had a particle size in the range of about 6 to about 12 mesh, U.S. Sieve Series, a BET surface area of about 1312 $m^2/g$ and a butane activity of about 14.8. Such coconut shell-based activated carbon granules are commercially available from Barnebey & Sutcliffe Corp. (Columbus, Ohio).

The following ingredients were used to prepare the carbon slip:

| | |
| --- | --- |
| activated carbon granules (6 × 12 mesh) | 800 g |
| polyvinyl acetate emulsion (UCAR 379 - 55 wt-% solids) | 60 g |
| polyvinyl acrylate emulsion (UCAR 163S - 55 wt-% solids) | 60 g |
| water addition | 800 g |

The procedures of Example 12 were used to prepare the slip except that the coconut shell-based activated carbon granules were substituted for the coal-based extrudates. The slip was compression cast into blocks. The blocks contained about 10 weight percent polymeric binder (based on the weight of the blocks) and provided a butane activity of about 14.3 grams per deciliter.

EXAMPLE 15

Carbon Structures From Coconut Shell-Based Activated Carbon Granules

A second set of blocks was generated from coconut shell-based activated carbon by starting with relatively larger granules. Specifically, the granules had a particle size in the range of about 8 to about 16 mesh, U.S. Sieve Series, a BET surface area of about 1414 $m^2/g$ and a butane activity of about 15.9. The coconut shell-based activated carbon granules of this size were also supplied by Barnebey & Sutcliffe Corp. (Columbus, Ohio).

The following ingredients were used to prepare the carbon slip:

| | |
|---|---|
| activated carbon granules (8 × 16 mesh) | 800 g |
| polyvinyl acetate emulsion (UCAR 379 - 55 wt-% solids) | 60 g |
| polyvinyl acrylate emulsion (UCAR 163S - 55 wt-% solids) | 60 g |
| water addition | 800 g |

Here again, the procedures of Example 12 were used to prepare the slip except that the coconut shell-based granules were substituted for the coal-based extrudates. The slip was compression cast into blocks containing about 10 weight percent polymeric binder (based on the weight of the blocks). Testing revealed a favorable butane activity of about 16.1 grams per deciliter.

We claim:

1. A microporous, monolithic carbonaceous article exhibiting substantially no loss in compressive strength upon heating to 200° C. and consisting essentially of activated carbon and a polymeric binder; said polymeric binder being present in an amount up to 13 percent, based on the weight of the article, and said article having a butane activity in excess of 8 grams per deciliter.

2. The article in accordance with claim 1 having a bulk density of at least about 0.25 grams/cubic centimeter.

3. The microporous, monolithic carbonaceous article in accordance with claim 1 wherein the polymeric binder is a polymer selected from a group consisting of a polyurethane, a polyacrylate, an epoxy, a vinyl acetate, a polyimide, and mixtures thereof.

4. The microporous, monolithic carbonaceous article in accordance with claim 1 wherein the polymeric binder is a thermosettable polymer.

5. The microporous, monolithic carbonaceous article in accordance with claim 1 wherein the polymeric binder is a polyvinyl acetate.

6. The microporous, monolithic carbonaceous article in accordance with claim 1 wherein said microporous, monolithic carbonaceous monolithic article further contains a water-soluble co-binder.

7. The microporous, monolithic carbonaceous article in accordance with claim 6 wherein said co-binder is a methyl cellulose.

8. The microporous, monolithic carbonaceous article in accordance with claim 6 wherein said co-binder is a methyl cellulose ether.

9. The microporous, monolithic carbonaceous article in accordance with claim 1 wherein said microporous, monolithic carbonaceous monolithic article further contains an inorganic filler selected from the group consisting of silica, alumina, spinel, titania, zirconia, zeolite, nitride, boride, and carbon fiber; said filler being present in an amount up to 20 percent by weight, based on the weight of the article.

10. A microporous, monolithic carbonaceous structure consisting essentially of active carbon and a water-dispersible high-temperature binder, said structure having a butane activity in excess of about 8 grams per deciliter, said high-temperature binder being thermally stable up to 275° C. and being present in an amount up to 13 percent, based on the weight of the composition.

11. The microporous, monolithic carbonaceous structure according to claim 10 wherein the high-temperature binder is a polyimide.

12. The microporous, monolithic carbonaceous structure according to claim 10 wherein the high-temperature binder is a polyamide-imide.

13. The microporous, monolithic carbonaceous structure according to claim 10 wherein the high-temperature binder is a silsesquioxane.

14. The microporous, monolithic carbonaceous article according to claim 10 wherein said structure further includes a co-binder present in an amount up to about 10 percent, based on the weight of the composition.

15. A microporous, monolithic carbonaceous article exhibiting substantially no loss in compressive strength upon heating to 200° C. and consisting essentially of activated carbon having a surface area in excess of about 1100 $m^2/g$ and a polymeric binder; said polymeric binder being present in an amount up to 13 percent, based on the weight of the article, and said article having a formation efficiency in excess of about 75 percent.

\* \* \* \* \*